United States Patent
Khan

(10) Patent No.: US 7,127,627 B2
(45) Date of Patent: Oct. 24, 2006

(54) POWER MANAGEMENT METHOD AND APPARATUS FOR USE IN ELECTRONIC DEVICES

(75) Inventor: Abul Basher Khan, Northolt (GB)

(73) Assignee: Psion Digital Limited (GB)

( * ) Notice: Subject to any disclaimer, the term of this patent is extended or adjusted under 35 U.S.C. 154(b) by 503 days.

(21) Appl. No.: 10/467,541

(22) PCT Filed: Feb. 11, 2002

(86) PCT No.: PCT/GB02/00555

§ 371 (c)(1),
(2), (4) Date: Dec. 15, 2003

(87) PCT Pub. No.: WO02/065262

PCT Pub. Date: Aug. 22, 2002

(65) Prior Publication Data

US 2004/0098629 A1    May 20, 2004

(30) Foreign Application Priority Data

Feb. 10, 2001  (GB) ................................ 0103405.7

(51) Int. Cl.
  G06F 1/32     (2006.01)
  H04M 1/00    (2006.01)

(52) U.S. Cl. ...................... 713/323; 713/300; 713/310; 713/321; 713/322; 713/324; 713/330; 713/340; 455/556.1; 455/556.2

(58) Field of Classification Search ................ 713/300, 713/310, 320–324, 330, 340; 455/556.1, 455/556.2

See application file for complete search history.

(56) References Cited

U.S. PATENT DOCUMENTS

| | | | | |
|---|---|---|---|---|
| 5,845,142 A | * | 12/1998 | Hayasaka | 713/340 |
| 5,983,073 A | * | 11/1999 | Ditzik | 455/11.1 |
| 5,987,617 A | * | 11/1999 | Hu et al. | 713/320 |
| 6,233,464 B1 | * | 5/2001 | Chmaytelli | 455/556.2 |
| 6,725,060 B1 | * | 4/2004 | Chhatriwala et al. | 455/556.2 |
| 2003/0159026 A1 | * | 8/2003 | Cupps et al. | 713/1 |
| 2004/0088697 A1 | * | 5/2004 | Schwartz et al. | 717/174 |

* cited by examiner

*Primary Examiner*—A. Elamin
(74) *Attorney, Agent, or Firm*—Synnestvedt Lechner & Woodbridge LLP

(57) ABSTRACT

A combination portable computer and mobile telephone device sends the portable computer portion into a sleep mode during periods of non-use; it can periodically and temporarily wake itself up so as to monitor the power consumption of a slave device, the mobile telephone, which depends on the same battery or power source.

14 Claims, 3 Drawing Sheets

POWER MANAGEMENT METHOD AND APPARATUS FOR USE IN ELECTRONIC DEVICES

CROSS REFERENCE TO RELATED APPLICATION

This application claims the priority of PCT Application No. PCT/GB02/00555 filed on Feb. 11, 2002 and British Application GB 0103405.7 filed on Feb. 10, 2001, the contents of both of which are hereby incorporated by reference.

BACKGROUND OF THE INVENTION

1. Field of the Invention

This invention relates to a power management method and apparatus for use in electronic devices. It is particularly applicable to combination devices powered by batteries comprising one portion which acts as a master and another portion which acts as a slave. Devices combining handheld computers (such as personal digital assistants) together with cellular telephones, pagers and other portable radio devices are examples of such combination devices.

2. Description of the Prior Art

Power management for handheld devices such as personal digital assistants (PDAs), cellular telephones and handheld computers present distinct problems to be resolved. Two problems in particular must be addressed: battery life and the protection of data stored in the device. Battery life is addressed by a number of different methods of reducing a device's power consumption, including causing the device to shut down (i.e. enter a low power consumption state) when not in use, referred to as going into a 'sleep' mode, and by causing devices such as cellular telephones to camp, i.e., cycle on and off many times a minute, switching on only very briefly to determine if a call or message is being transmitted to the cellular telephone.

Certain types of electronic data storage, for example random access memories or RAM, typically require that the device retain some electrical charge in its batteries to preserve stored data—if the battery is completely discharged, the data will be lost. To avoid loss of data, it is therefore common for such electronic devices to shut down completely before a certain minimum safe battery charge is reached. Alternatively, some devices, such as the Psion® $5^{mx}$ have a secondary battery to protect memory—though this device also shuts down at a minimum battery charge. While such shut-down arrangements are an effective way of protecting memory, they are extremely irritating to users, since they necessarily inhibit access to the functions of the device; premature shut down, i.e., a shut down before a critical battery energy level is reached, is yet more irritating and therefore undesirable.

Many such portable devices also use rechargeable batteries. However, rechargeable batteries' characteristics (including the amount of energy they can store and provide) for a given charge vary (i) across their lifespan; (ii) because users often have second or replacement batteries; and (iii) because manufacturing of such batteries often does not produce batteries with consistent characteristics.

Combining two different types of consumer electronic device, such as a handheld computer and a cellular telephone (or a wireless LAN emitter), into a single device (a so-called "one-box" solution) presents special difficulties. First, the power conservation strategies followed by the devices are different—the cellular telephone camps, i.e., constantly cycles on and off—while the handheld computer will typically sleep or power down to preserve power. Nonetheless, both devices will typically be powered by a single battery. Secondly, one device must usually be the dominant or controlling device, i.e., the 'master', and the other device the subordinate or controlled device, usually referred to as the 'slave'. Usually it is the master which will control system memory and determine when power levels have reached a critically low level, requiring a complete shut down of the device so as to protect system memory. However, if the master is the handheld computer component of the device, it will not normally be able to monitor power levels while it is in a sleep state, although the cellular telephone radio component, which is camping, will continue to consume electrical power.

As a practical matter, the handheld computer component must normally be the master and will supply most of the principal telephone functions and features, while the functions of the cellular radio component must be limited. Thus it is the handheld computer component that would usually dial calls, decide to accept calls, display data, maintain memory, configure the telephone and control power. The slave cellular radio component would usually provide signal transmission/reception as well as camping. It may have limited power management to ensure minimal transmission quality, i.e., inhibiting the cellular radio from operation if the instantaneously available power levels are too low to transmit a signal of acceptable quality. In addition, some cellular standards such as the GSM standard allow the cellular radio to vary its transmission power depending on conditions in a given cell (e.g., distance from cellular mast), a useful facility which has the drawback of also varying power consumption by the slave device, leading to uncertain energy consumption rates.

While we have described the power management problems associated with a combined handheld computer and cellular telephone, numerous master/slave arrangements raise the same or similar problems, including devices combining handheld computers with wireless LAN radios such as radios operating on the IEEE 802.11 standard or the Bluetooth® standard.

SUMMARY OF THE INVENTION

In a first aspect of the invention, there is a power management method for use in an electronic device, in which the device comprises a first section which stores volatile data and is capable of entering a sleep state and a second section which can automatically and regularly power itself up and down, and a power source powering both the first and the second sections;

wherein the method comprises the steps of the first section powering itself up from a sleep state automatically and a power management algorithm then operating to assess whether both the first and the second sections should be taken to a low power consumption state.

The invention in one implementation is a method by which a master device which enters a sleep mode during periods of non-use can monitor the power consumption of the slave device, which depends on the same battery or power source and remains in operation while the master device is in a sleep state. In principle, this implementation of the invention consists of arranging the sleep mode of the master device, so that the master device will briefly and periodically partially revive and measure the remaining energy, and if the energy remaining in the power source or the battery has dropped below a certain critical level, shuts both master and slave devices down completely. The decision as to when to shut down can be arranged in either of three ways—(i) the device can have a preset threshold based on a calculation of maximum likely power consumption by the slave device before the next revival of the master device, or (ii) the master device can engage in a dynamic calculation of power consumption rates. When this calculation determines that remaining power will drop below the level necessary to protect data before the next scheduled revival of the master, the devices are shut down, or (iii) the master can simply reset its next revival time so as to allow it to shut down the joint devices when the power remaining in power source or battery is at a minimum safe level to protect the data stored in the device. In addition, the master device may in certain arrangement be capable of resetting certain device parameters of the slave device to lower its power consumption, by for example elongating the off periods in the camp mode of a cellular telephone.

DETAILED DESCRIPTION

The invention is described with respect to a device at present under development by Psion PLC of Great Britain which comprises a GSM or UMTS cellular radio combined in a single device with a handheld computer, collectively powered by a single rechargeable battery, which is potentially replaceable by the user. The handheld computer's principle function is to store and display e-mails and other forms of data received over the GSM/UMTS network. It should be apparent that variations on this arrangement are possible, including but not limited to replacing the GSM/UMTS cellular radio with another type of cellular telephone radio or a wireless local area network radio (wireless LAN) or other slave device which is either consistently on or camps while an associated master device sleeps.

Figure 1:
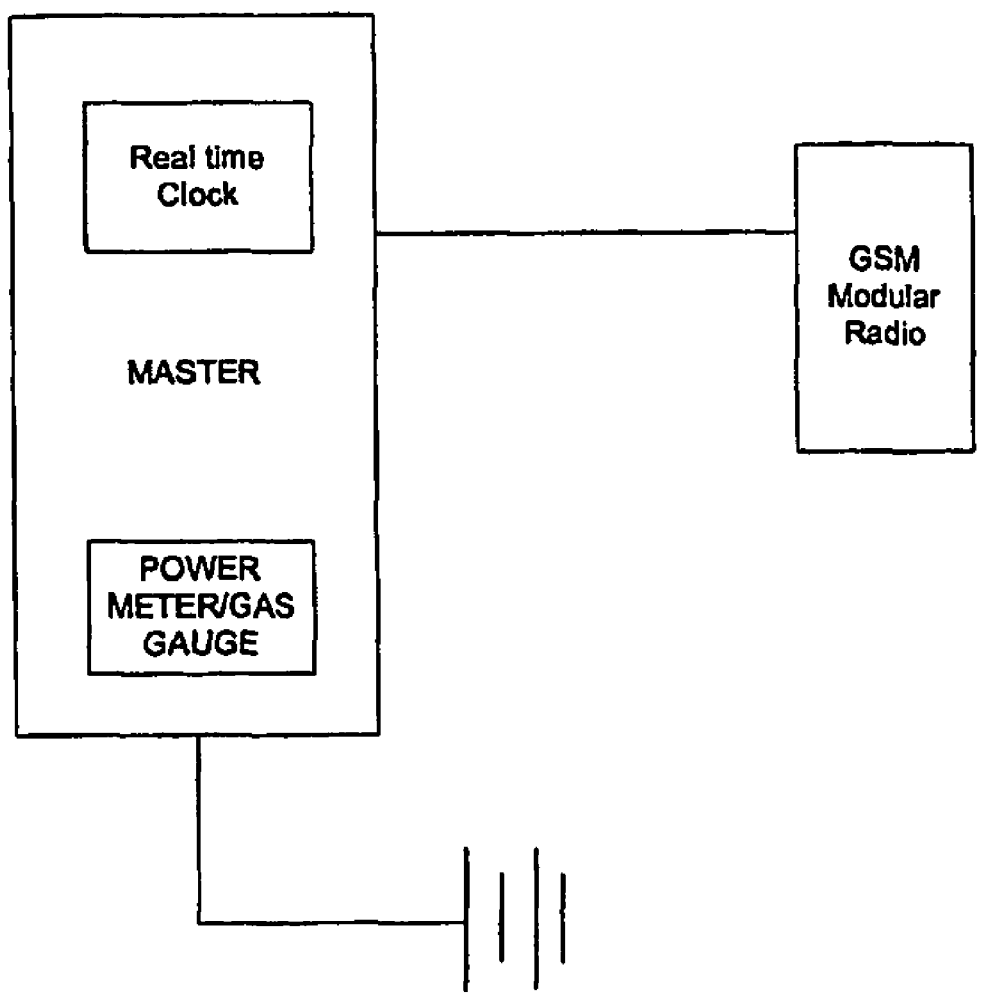
FIG. 1 is a schematic of a master/slave device containing a computer linked to a GSM modular radio.

In one implementation as illustrated in FIG. 1, the GSM radio is combined with a handheld computer which operates using a microprocessor developed by Psion and known as Halla which is based on the ARM920T™ processor and which is based on a 16/32 bit embedded reduced instruction set (RISC) cached processor macro-cell core developed by ARM Holdings PLC of the United Kingdom as part of a family of processors referred to as the ARM9T™ Thumb® series. Development kits, including development boards for this ARM920T™ are available from ARM and further detailed information is available from the ARM PLC website http://www.arm.com. Halla incorporates a power measurement function which measures the energy gain of rechargeable batteries during charging and can measure subsequent power consumption providing an accurate measure of remaining battery charge. Alternately, microprocessors such as the bq2945 Gas Gauge IC manufactured by Benchmarq Microelectronics Inc., of the United States are available which measure the available charge in NiCd, NiMH, and Li-Ion batteries, and which can be integrated into a battery pack, or into the device. These devices typically reset after the battery is fully recharged, to a predetermined presumed energy capacity for the battery and measure power consumption from that point.

In the implementation as illustrated in FIG. 1, the combination device 10 has five principle components, a battery 12, a GSM radio module 14, a computer 16, a real time clock ("RTC") 18 which is always ON and a power meter 20. The operating system of the computer, running in step 26 is provided with a standard sleep function 28, which initiates a sleep routine 30, if after a predetermined time, no user inputs have been detected by the computer. As illustrated by the flowchart in FIG. 2, the basic sleep routine 30 consists of addressing the system gas gauge or power meter 32 to determine the remaining battery energy ("$E_R$") at the time the sleep routine is initiated, and writing a record to the system's RAM of that measured energy level. If the energy level is below a preset critical energy ("$E_C$") the entire device is shut down (or placed in a safety mode) M including both the master and the slave devices. If the remaining battery energy is more than the preset critical energy, the device writes an end time for the sleep period, in step 36, to the RTC, and places the master component, i.e., the computer in a sleep mode 38. At the end of the sleep period set by the clock, in step 40, it revives the computer by causing an interrupt to be sent to the processor, invoking an interrupt handler to run a script carrying out a short routine, which does not include powering user interfaces or displays. In this first aspect of the invention the routine consists of measuring the remaining battery energy, step 32, and if it is below the preset critical energy, shutting down the device, step 34, and if it is greater than the preset critical energy writing an end time for a new sleep period to the RTC, step 36, and placing the master component, i.e., the computer, into a new sleep period, step 38.

The system will perform a measurement of the remaining power in the battery, step 32, and only place the device in a sleep mode 38 if that remaining energy is higher than a preset minimum for allowing the master component to sleep.

The sleep periods ("$T_S$") are calculated in step 40 by dividing the available energy ("$E_A$"), which is equal to the remaining energy minus the critical energy ($E_R - E_C$) by a pre-set value for energy consumption by the cellular component per unit time while camping ("$P_C$"), and dividing the time value thus obtained by a preset number ("N") which is greater than 1, i.e., $$T_S = (E_R - E_C)/(P_C \times N)$$

N is described as a heuristic factor and will usually have a value of 1.5 to 2 N may have a variable value greater than 1, which is calculated by comparing the energy consumption rate during the previous sleep cycle, step 40, and comparing it with an average calculated for either all previous sleep cycles of a finite number of previous sleep cycles, and if the energy consumption during the last sleep cycle exceeds one standard deviation, increasing the preset initial value of N by 1 (or another selected value).

$P_C$ is calculated by determining the energy consumption rate by the slave during the previous sleep cycle.

While the invention has been described with reference to the preferred embodiment thereof, it will be appreciated by those of ordinary skill in the art that modifications can be made to the structure and elements of the invention without departing from the spirit and scope of the invention as a whole.

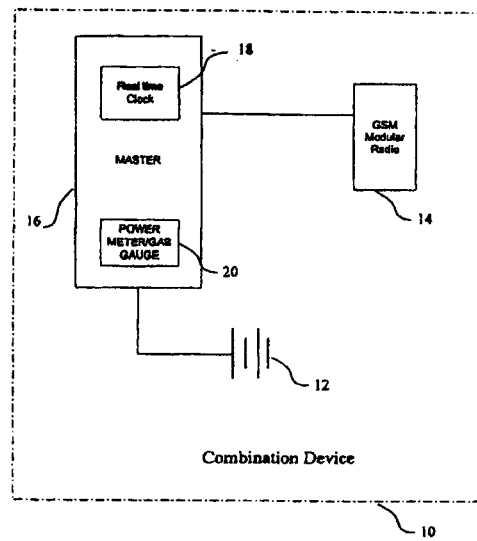

What is claimed is:

1. A power management method for use in an electronic device, comprising the steps of:
   a) providing a first section which stores volatile data and is capable of entering a low power consumption state;
   b) providing a second section which can automatically and regularly power itself up and down;
   c) providing a power source powering both the first and the second sections;
   d) powering the first section up from the low power consumption state to a powered up state, automatically; and
   e) assessing, using a power management algorithm operating on the first section in the powered up state to assess whether both the first and the second sections should be taken to a low power consumption state.

2. The method of claim 1 in which the power management algorithm causes both the first and the second section to be taken to a low power consumption state on the basis of an inference of likely future power consumption based on pre-defined figures.

3. The method of claim 1 in which the power management algorithm causes both the first and the second section to be taken to a low power consumption state on the basis of a calculation of actual power usage.

4. The method of claim 1 in which the power management algorithm is operable to cause the elapsed time before the first section is automatically revived from sleep to be varied.

5. The method of claim 1 in which the first section can vary at least one parameter relating to the power consumption of the second section in dependence on an output from the power management algorithm.

6. The method of claim 1 in which the first section comprises a computing device and the second section comprises a communications device.

7. The method of claim 1 in which the second section automatically and regularly powers itself up and down as part of a camping process.

8. An electronic device programmed to perform a power management method, in which the device comprises a first section which stores volatile data and is capable of entering a low power consumption state and a second section which can automatically and regularly power itself up and down, and a power source powering both the first and the second sections;
   wherein the first section powers itself up from a low power consumption state automatically and a power management algorithm then operates to assess whether both the first and the second sections should be taken to a low power consumption state.

9. The device of claim 8 in which the power management algorithm causes both the first and the second section to be taken to a low power consumption state on the basis of an inference of likely future power consumption based on pre-defined figures.

10. The device of claim 8 in which the power management algorithm causes both the first and the second section to be taken to a low power consumption state on the basis of a calculation of actual power usage.

11. The device of claim 8 in which the power management algorithm is operable to cause the elapsed time before the first section is automatically revived from sleep to be varied.

12. The device of claim 8 in which the first section can vary one or more parameters relating to the power consumption of the second section in dependence on an output from the power management algorithm.

13. The device of claim 8 in which the first section comprises a computing device and the second section comprises a communications device.

14. The device of claim 8 in which the second section automatically and regularly powers itself up and down as part of a camping process.

* * * * *

UNITED STATES PATENT AND TRADEMARK OFFICE
CERTIFICATE OF CORRECTION

PATENT NO. : 7,127,627 B2
APPLICATION NO. : 10/467541
DATED : October 24, 2006
INVENTOR(S) : Abul Basher Khan Page 1 of 3

It is certified that error appears in the above-identified patent and that said Letters Patent is hereby corrected as shown below:

On the title page, delete Figure 1 and substitute therefor Figure 1 as shown on the attached title page On Drawing Sheet 1 of 1, delete Figure 1 and replace it with:

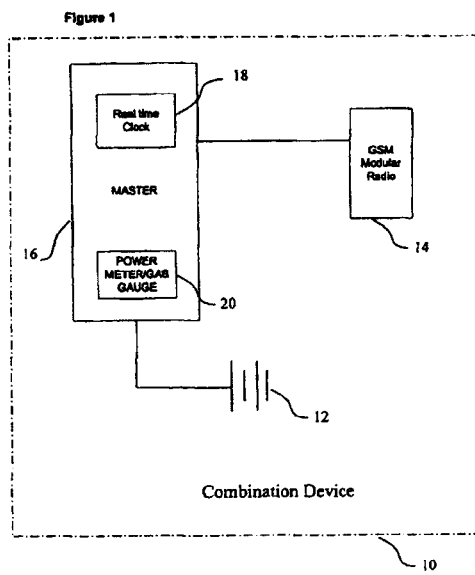

Signed and Sealed this
Twenty-third Day of August, 2011

David J. Kappos
*Director of the United States Patent and Trademark Office*

CERTIFICATE OF CORRECTION (continued)
U.S. Pat. No. 7,127,627 B2

Figure 2:
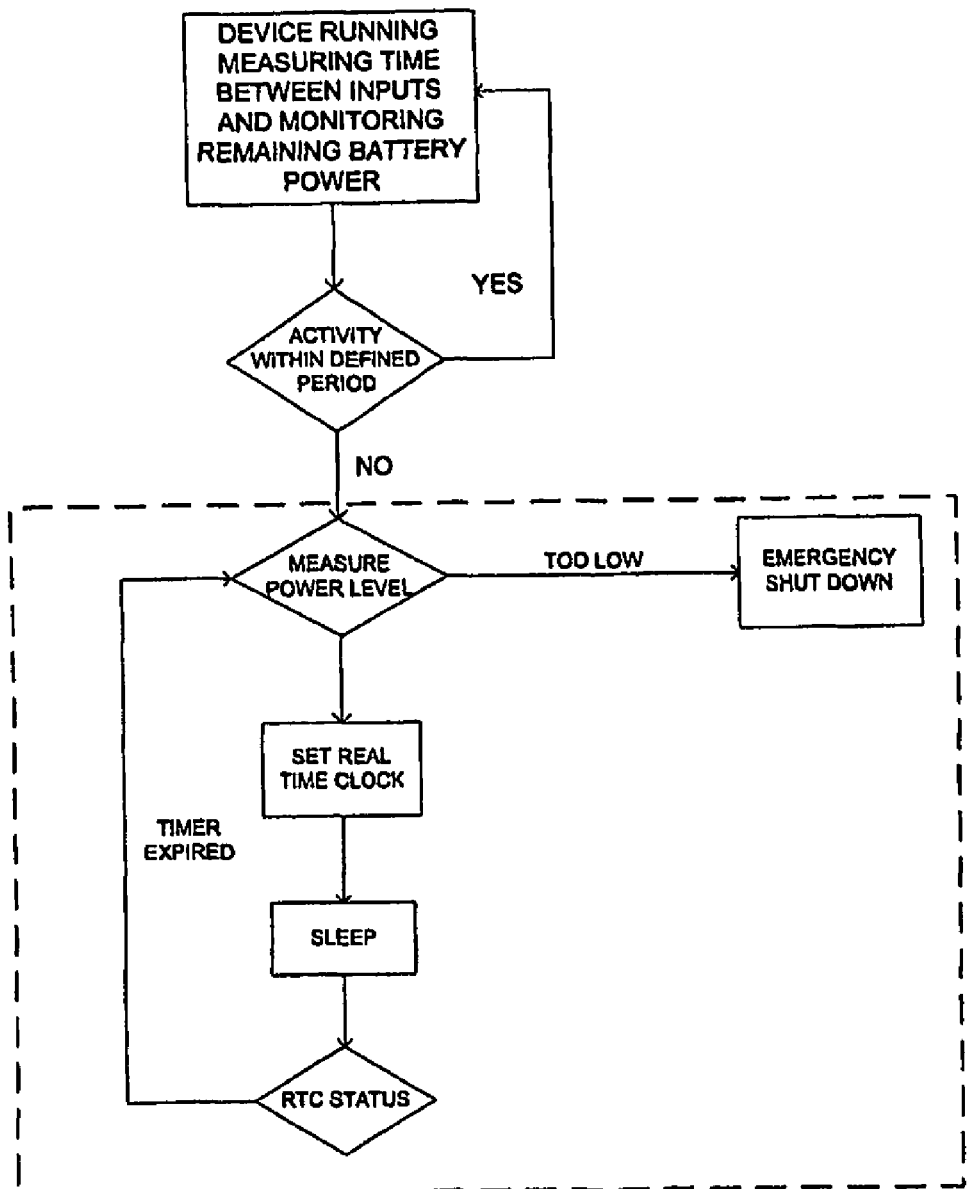
FIG. 2 is a flowchart of the method of operation of the power management arrangement, with a broken line delineating the power management/sleep steps of the flowchart.
Figure 3:
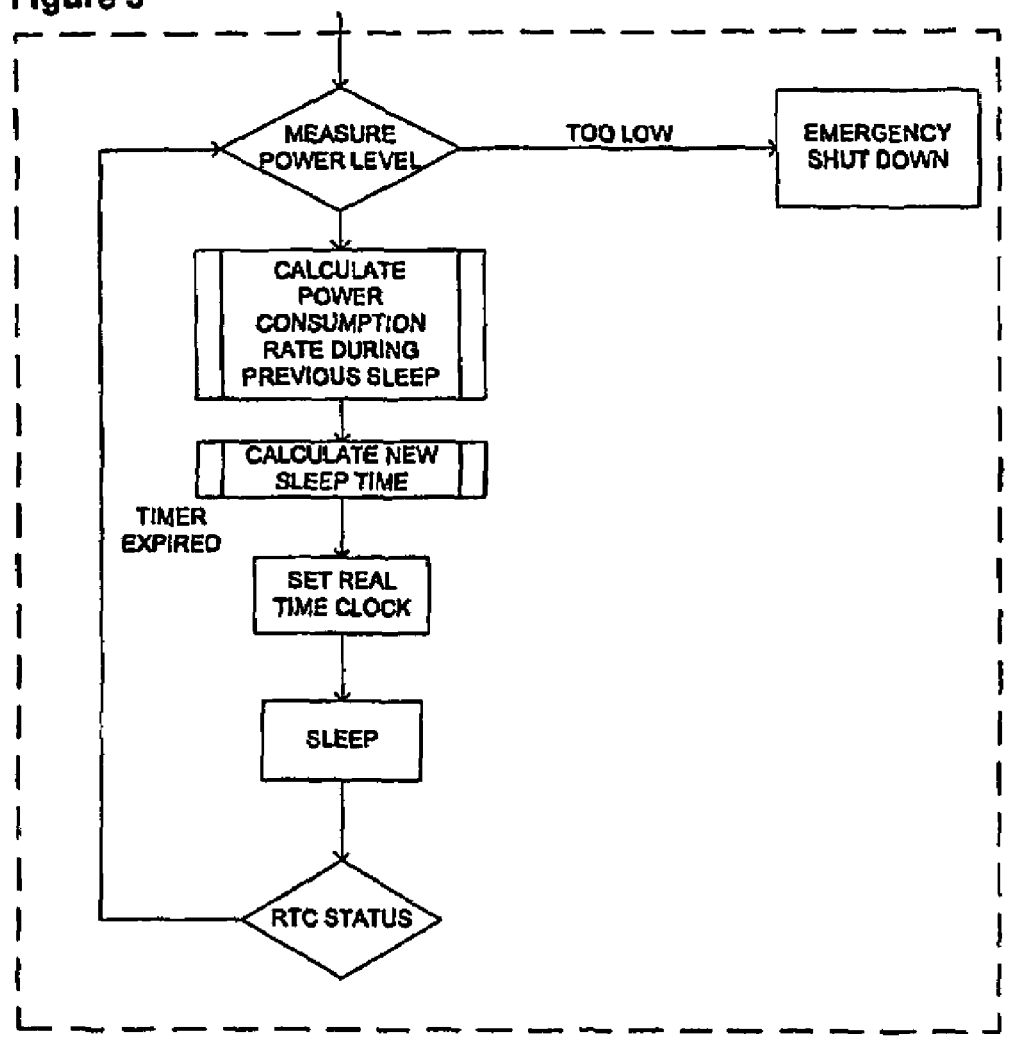
FIG. 3 is a flowchart illustrating the area delineated by the broken line in FIG. 2 when a dynamic power management method is in use.

On Drawing Sheet 2 of 2, delete Figure 2 and replace it with:

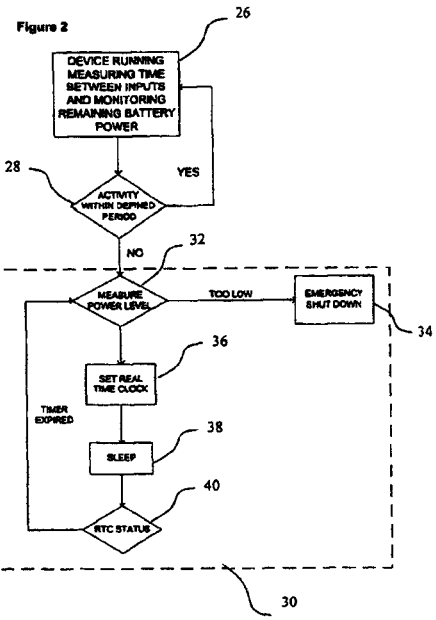

On Drawing Sheet 2 of 2, delete Figure 2 and replace it with:

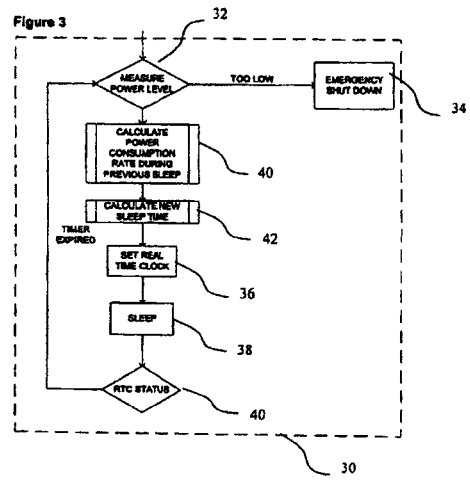

(12) United States Patent
Khan

(10) Patent No.: US 7,127,627 B2
(45) Date of Patent: Oct. 24, 2006

(54) POWER MANAGEMENT METHOD AND APPARATUS FOR USE IN ELECTRONIC DEVICES

(75) Inventor: Abul Basher Khan, Northolt (GB)

(73) Assignee: Psion Digital Limited (GB)

( * ) Notice: Subject to any disclaimer, the term of this patent is extended or adjusted under 35 U.S.C. 154(b) by 503 days.

(21) Appl. No.: 10/467,541

(22) PCT Filed: Feb. 11, 2002

(86) PCT No.: PCT/GB02/00555

§ 371 (c)(1),
(2), (4) Date: Dec. 15, 2003

(87) PCT Pub. No.: WO02/065262

PCT Pub. Date: Aug. 22, 2002

(65) Prior Publication Data
US 2004/0098629 A1 May 20, 2004

(30) Foreign Application Priority Data
Feb. 10, 2001 (GB) .............................. 0103405.7

(51) Int. Cl.
*G06F 1/32* (2006.01)
*H04M 1/00* (2006.01)

(52) U.S. Cl. ............... 713/323; 713/300; 713/310; 713/321; 713/322; 713/324; 713/330; 713/340; 455/556.1; 455/556.2

(58) Field of Classification Search .......... 713/300, 713/310, 320–324, 330, 340; 455/556.1, 455/556.2
See application file for complete search history.

(56) References Cited

U.S. PATENT DOCUMENTS

| | | | |
|---|---|---|---|
| 5,845,142 A * | 12/1998 | Hayasaka | 713/340 |
| 5,983,073 A * | 11/1999 | Ditzik | 455/11.1 |
| 5,987,617 A * | 11/1999 | Hu et al. | 713/320 |
| 6,233,464 B1 * | 5/2001 | Chmaytelli | 455/556.2 |
| 6,725,060 B1 * | 4/2004 | Chhatriwala et al. | 455/556.2 |
| 2003/0159026 A1 * | 8/2003 | Cupps et al. | 713/1 |
| 2004/0088697 A1 * | 5/2004 | Schwartz et al. | 717/174 |

* cited by examiner

*Primary Examiner*—A. Elamin
(74) *Attorney, Agent, or Firm*—Synnestvedt Lechner & Woodbridge LLP

(57) ABSTRACT

A combination portable computer and mobile telephone device sends the portable computer portion into a sleep mode during periods of non-use; it can periodically and temporarily wake itself up so as to monitor the power consumption of a slave device, the mobile telephone, which depends on the same battery or power source.

14 Claims, 3 Drawing Sheets